J. PAYNE.
MILL-SPINDLES.
No. 184,105. Patented Nov. 7, 1876.
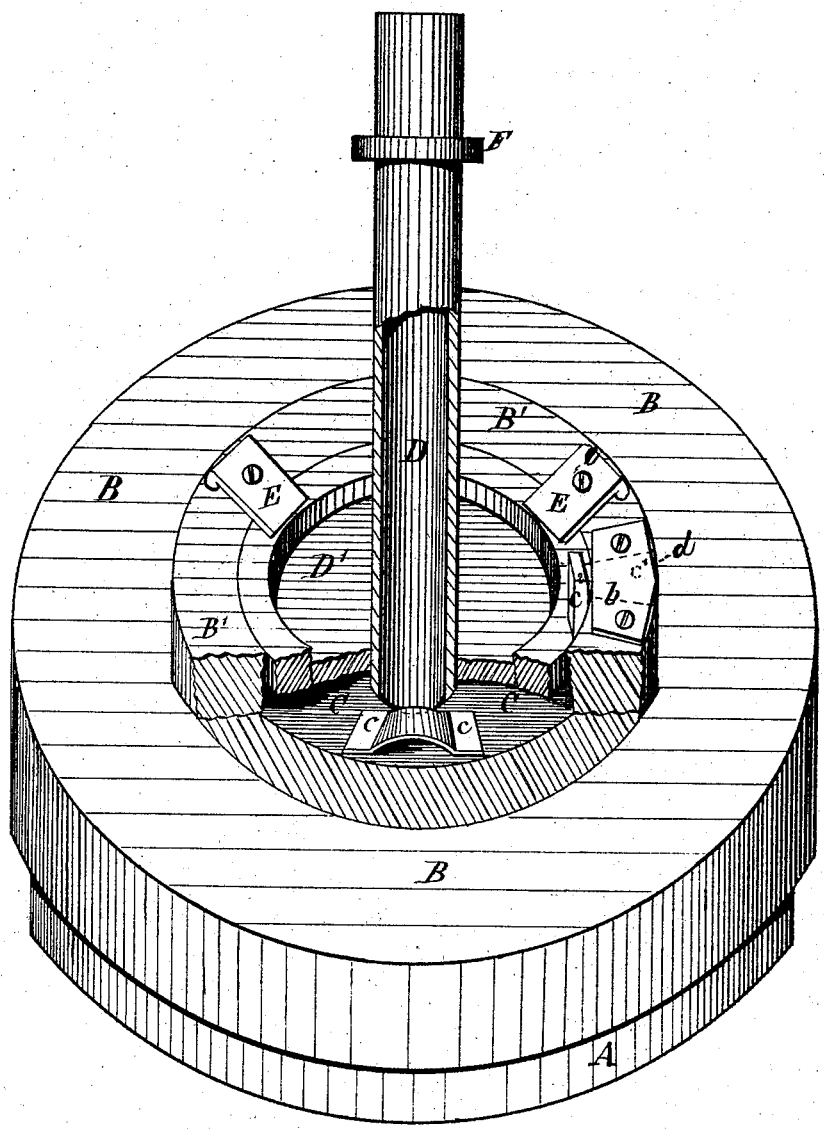
Witnesses
Inventor
John Payne

UNITED STATES PATENT OFFICE.

JOHN PAYNE, OF MOUNT VERNON, OHIO.

IMPROVEMENT IN MILL-SPINDLES.

Specification forming part of Letters Patent No. 184,105, dated November 7, 1876; application filed April 25, 1876.

*To all whom it may concern:*

Be it known that I, JOHN PAYNE, of the city of Mount Vernon, in the county of Knox and State of Ohio, have invented certain new and useful Improvements in Millstone-Spindles; and I do hereby declare that the following is a full, clear, and exact description thereof, which will enable others skilled in the art to which it appertains to make and use the same, reference being had to the accompanying drawings, and to letters of reference marked thereon, which form a part of this specification.

The invention relates to that class of mills in which the upper stone is the runner, and is supported upon, and driven by, a hollow spindle, the bottom stone being adjustable vertically for the purpose of "setting" it to or from the upper stone, or the kind or condition of the grain, the power, the results desired, or other circumstance may require.

The invention consists in a certain novel construction and combination of devices through which the spindle is connected with the stone, whereby certain advantages of adjustment are derived, and the escape of any foreign substances from between the stones is facilitated, as will be fully explained.

In the drawing, which is a perspective view, partly broken away, A represents the stone, which may be of any desired stock and construction. B is a metal casing, cap, or cup, rigidly secured to the stone, and provided upon its upper face with a circular rib, B', within which is a sunken recess or chamber, as clearly shown at C. Within this chamber, and resting upon the bottom thereof, are four, more or less, semi-elliptical springs, c. D is the spindle. It is hollow, in order that the grain may be fed into the eye of the stone through it, and carries at its lower end a flange, D', which fits closely within the recess C, except that it is not quite as thick as the recess is deep. $d$ is a key-seat cut in the edge of the flange D'. $c^1 c^2$ is a key arranged in a slot formed for its reception in the rib B', in which it (the key) is secured by means of a plate, $b$, screwed to the rib. Both the key and the slot are tapering in form, as indicated by the dotted lines, and the upwardly-projecting spur $c^2$ rises above and abuts against the inner face of plate $b$, thus retaining the key in position, as will be readily understood without further explanation.

E are clamps, three, four, or more, one end of each resting upon the rib B' and the other end resting upon the upper face of the flange D'. Each clamp is secured to the rib by means of one or more set-screws or bolts, $e$. F is a collar or shoulder formed upon or attached to the upper part of the spindle.

Any desired construction or arrangement of lighter-screw, bridge tree, or other devices for supporting and setting the spindle or stone, or for driving the same, may be employed, and as the invention does not relate to any of these last-named features, they need not be shown or particularly described.

From the above description it will be seen that by loosening or tightening one of the clamps E the corresponding side of the stone will be lowered or raised, and the position of the runner relative to the bed-stone may be thereby accurately adjusted, while at the same time, should any foreign substance accidentally get in between the stones, the springs will allow the runner to yield and let such substance pass out freely.

What I claim is—

1. The combination of the casing B, spindle D, flange D', springs $c$, and screw-clamps E, substantially as set forth.

2. The combination, with the flange D' and rib B', of the key $c^1 c^2$, and coupling-plate $b$, substantially as set forth.

In testimony that I claim the foregoing as my own I affix my signature in presence of two witnesses.

JOHN PAYNE.

Witnesses:
JOHN J. LEMON,
GEO. M. VOSE.